(12) United States Patent
Chambard et al.

(10) Patent No.: US 10,774,250 B2
(45) Date of Patent: Sep. 15, 2020

(54) ADHESIVE COMPOSITIONS AND THEIR APPLICATIONS

(71) Applicant: Dow Silicones Corporation, Midland, MI (US)

(72) Inventors: Gregory Chambard, Nivelles (BE); Tommy Detemmerman, Wezembeek-Oppem (BE); Tatiana Dimitrova, Braine-L'Alleud (BE); Frederic Gubbels, Houtain-le-Val (BE)

(73) Assignee: DOW SILICONES CORPORATION, Midland, MI (US)

( * ) Notice: Subject to any disclaimer, the term of this patent is extended or adjusted under 35 U.S.C. 154(b) by 0 days.

(21) Appl. No.: 16/098,516

(22) PCT Filed: May 5, 2017

(86) PCT No.: PCT/EP2017/060838
§ 371 (c)(1),
(2) Date: Nov. 2, 2018

(87) PCT Pub. No.: WO2017/191322
PCT Pub. Date: Nov. 9, 2017

(65) Prior Publication Data
US 2019/0144725 A1 May 16, 2019

(30) Foreign Application Priority Data

May 6, 2016 (GB) .................................. 1607955.0
May 23, 2016 (GB) .................................. 1609077.1
Mar. 3, 2017 (GB) .................................. 1703484.4

(51) Int. Cl.
*C09J 183/04* (2006.01)
*C08K 5/05* (2006.01)
(Continued)

(52) U.S. Cl.
CPC ............... *C09J 183/04* (2013.01); *C08K 5/05* (2013.01); *C08K 5/5419* (2013.01); *C08L 83/00* (2013.01);
(Continued)

(58) Field of Classification Search
CPC ..................................................... C09J 183/04
See application file for complete search history.

(56) References Cited

U.S. PATENT DOCUMENTS

| 4,087,585 A | 5/1978 | Schulz |
| 4,591,622 A | 5/1986 | Blizzard et al. |

(Continued)

FOREIGN PATENT DOCUMENTS

| GB | 2424898 A | 10/2006 |
| JP | S63172768 A | 7/1988 |

(Continued)

OTHER PUBLICATIONS

PCT/EP2017/060838 International Search Report dated Jun. 30, 2017, 4 pages.
(Continued)

Primary Examiner — Daniel H Lee
(74) Attorney, Agent, or Firm — Warner Norcross + Judd LLP (57) ABSTRACT

A method of adhering a substantially cured or fully cured silicone based material to a substrate surface is provided. The silicone based material is obtained by curing a condensation curable composition. The condensation curable composition comprises: (I) at least one condensation curable silyl terminated polymer having at least one hydrolysable and/or hydroxyl functional group(s) per molecule; (II) a cross-linker selected from the group of silanes having at least two hydrolysable groups per molecule; and/or silyl functional molecules having at least two silyl groups, each
(Continued)

silyl group containing at least one hydrolysable group; and (III) a condensation catalyst selected from the group of titanates and zirconates. The method includes applying a reactive interlayer to the substrate surface and applying pressure to sandwich the reactive interlayer between a surface of the silicone based material and the substrate surface, thereby causing chemical bonding of the silicone based material to the substrate.

16 Claims, 1 Drawing Sheet

(51) Int. Cl.
| | | |
|---|---|---|
| *C08K 5/5419* | (2006.01) | |
| *E06B 3/663* | (2006.01) | |
| *E06B 3/673* | (2006.01) | |
| *C08L 83/04* | (2006.01) | |
| *C08L 83/00* | (2006.01) | |
| *C09J 11/06* | (2006.01) | |
| *C08G 77/16* | (2006.01) | |
| *C08G 77/18* | (2006.01) | |

(52) U.S. Cl.
CPC .............. *C08L 83/04* (2013.01); *C09J 11/06* (2013.01); *E06B 3/66333* (2013.01); *E06B 3/6733* (2013.01); *C08G 77/16* (2013.01); *C08G 77/18* (2013.01); *E06B 2003/66338* (2013.01)

(56) References Cited

U.S. PATENT DOCUMENTS

| | | |
|---|---|---|
| 4,754,013 A | 6/1988 | Antonen |
| 5,194,649 A | 3/1993 | Okawa |
| 5,300,171 A | 4/1994 | Braun et al. |
| 6,169,142 B1 | 1/2001 | Nakano et al. |
| 8,153,724 B2 | 4/2012 | Maton et al. |
| 2007/0042108 A1* | 2/2007 | Gantner .................. A61L 15/58 427/2.1 |
| 2008/0312365 A1 | 12/2008 | Maton et al. |
| 2013/0338289 A1* | 12/2013 | Jadot ....................... C08L 83/06 524/400 |
| 2015/0275045 A1 | 10/2015 | Adachi et al. |
| 2015/0376482 A1 | 12/2015 | Bekemeier et al. |

FOREIGN PATENT DOCUMENTS

| | | |
|---|---|---|
| JP | 2008534768 A | 8/2008 |
| JP | 2015537073 A | 12/2015 |
| WO | 2010143357 A1 | 12/2010 |
| WO | WO2014124389 A1 | 8/2014 |
| WO | 2016120270 A1 | 8/2016 |

OTHER PUBLICATIONS

Machine assisted English translation of WO2010143357A1 obtained https://patents.google.com from Mar. 3, 2020, 21 pages.

* cited by examiner

ADHESIVE COMPOSITIONS AND THEIR APPLICATIONS

CROSS-REFERENCE TO RELATED APPLICATIONS

This application is the National Stage of International Application No. PCT/EP2017/060838 filed on 5 May 2017, which claims priority to and all advantages of Great Britain (GB) Patent Appl. No. 1607955.0 filed on 6 May 2016, GB Patent Appl. No. 1609077.1 filed on 23 May 2016, and GB Patent Appl. No. 1703484.4 filed on 3 Mar. 2017, the contents of which are hereby incorporated by reference.

The present disclosure generally relates to adhesion of a pre-cured condensation curing silicone based material to a substrate surface, using an intermediate layer (or reactive interlayer) e.g. a primer between the elastomer and the substrate surface.

Pressure-sensitive adhesives (PSAs) and soft gels form a bond with a substrate by the application of light pressure to marry the adhesive with the substrate surface, which is often referred in the industry by the term 'tack' or 'tackiness' of the product. The resulting physical bonds form because the adhesive is soft enough to flow, or wet, the substrate surface but also has strength because the adhesive is hard enough to resist flow when stress is applied to the bond. Once the adhesive and the substrate surface are in proximity, molecular interactions such as van der Waals forces may contribute significantly to the ultimate bond strength. That said what is typically referred to as chemical adhesion by the chemical bonding of reactive groups across the adhesive/substrate interface and a pre-cured PSA largely do not occur.

For the avoidance of doubt and for the sake of this disclosure the term "physical adhesion" is intended to mean non-chemical adhesion, i.e. a temporary or reversible form of adhesion by physical interaction between adjacent surfaces e.g. (but not limited to) dispersive and/or diffusive adhesion.

A silicone pressure sensitive adhesive is generally understood to be an adhesive comprising one or more siloxane components possessing sufficient tackiness and cohesive strength so that it can be adhered with mild pressure to a clean substrate and then usually can be ripped therefrom if necessary, and it generally comprises a crosslinkable diorganopolysiloxane, an organopolysiloxane resin comprising triorganosiloxy units and $SiO_{4/2}$ units, and a curing agent, or comprises a condensation product of a diorganopolysiloxane and an organopolysiloxane resin comprising triorganosiloxy units and $SiO_{4/2}$ units, and a curing agent as explained for example in U.S. Pat. Nos. 5,300,171 and 4,591,622. Organoperoxide-curable silicone pressure-sensitive adhesives usually contain vinyl-containing diorganopolysiloxane and cure by the action of an organoperoxide at elevated temperatures. Hydrosilylation reaction-curable silicone pressure-sensitive adhesive cure under hydrosilylation reaction usually between vinyl groups of a diorganopolysiloxane etc. and SiH groups of an organohydrogenpolysiloxane by the action of a platinum-based catalyst.

Condensation reaction-curable silicone pressure-sensitive adhesives cure under condensation reaction usually between silanol groups or hydrolysable groups of a diorganopolysiloxane by the action of a condensation catalyst.

Condensation curable compositions and the resulting materials obtained upon the curing thereof comprising:
(i) at least one condensation curable silyl terminated polymer having at least one, typically at least 2 hydrolysable and/or hydroxyl functional groups per molecule;
(ii) a cross-linker selected from the group of a silicone, an organic polymer, a silane which contains at least two hydrolysable groups per molecule and, alternatively at least three hydrolysable groups per molecule and and/or silyl functional molecules having at least 2 silyl groups, each silyl group containing at least one hydrolysable group
(iii) a condensation catalyst selected from the group of titanates and/or, zirconates characterized in that the molar ratio of hydroxyl and/or hydrolysable groups in polymer (i) to hydrolysable groups from (ii) is between 0.5:1 and 1:1 using a monosilane cross linker or 0.75:1 to 3:1 using disilanes and the molar ratio of M-OR or functions to the hydroxyl and/or hydrolysable groups in polymer (i) is comprised between 0.01:1 and 0.5:1, where M is titanium or zirconium; have been found to exhibit physical adhesion depending on their hardness to substrates. Softer materials of this type especially those exhibiting a hardness below Shore 80 in the type 00 scale according to ASTM D 2240-05(2010) have been found to successfully physically adhere to a wide variety of substrates. These compositions are reliant on titanate/zirconate cure catalysts that can be cured in the absence of moisture bearing filler leading to a bulk cure in a few minutes to a few hours depending on the composition.

It is well known that a primer can be used to improve adhesion of an uncured (wet applied) sealant composition to surface when cured. However primers are not used to adhere pre-cured elastomers to substrates. Primer materials enhance the adhesion of condensation curable silicone based compositions to substrate surfaces e.g. metal surfaces. Primers are relatively thin coatings designed to adhere to the surface of a substrate to form a binding layer that is better prepared to receive e.g. silicone sealant or a layer of paint or the like. Typically the primer will be thinly applied and will dry/cure in a few seconds or minutes. If the user wishes to adhere a sealant material to the substrate surface via the use of the primer subsequent to drying the primer, a layer of uncured sealant is applied to the primed substrate surface and after working (if necessary) the sealant is allowed to cure. The fact that the sealant is applied uncured has, historically, been critical in order to generate a chemical interaction between the curing sealant composition at its interface with the primer on the substrate surface. If the sealant is applied onto the primed surface post-cure little or no chemical interaction will take place at the interface because the layer of sealant has pre-cured and therefore has little or no chemically active groups available for chemically binding with active groups at the surface of the binder. In the present invention the term interlayer is used to define suitable liquid coating compositions, not only primers, which may be applied to a surface of a substrate and then dried/cured to provide a surface coating of a submicronic thickness, but also liquid compositions, which cure to provide thicker coatings on the surface of a substrate, which may be millimetric.

There is provided herein a method of adhering a substantially cured or fully cured silicone based material to a substrate surface wherein said substantially cured or fully cured silicone based material is obtained by curing a condensation curable composition comprising:
(i) at least one condensation curable silyl terminated polymer having at least one, typically at least 2 hydrolysable and/or hydroxyl functional groups per molecule;
(ii) a cross-linker selected from the group of
silanes having at least 2 hydrolysable groups, alternatively at least 3 hydrolysable groups per molecule group; and/or silyl functional molecules having at least 2 silyl groups, each silyl group containing at least one hydrolysable group (iii) a condensation catalyst selected from the group of titanates and zirconates characterized in that:

the molar ratio of hydroxyl and/or hydrolysable groups in polymer (i) to hydrolysable groups from (ii) is between 0.1:1 to 4:1 and the molar ratio of M-OR functions to the sum of moisture present in the formulation and hydroxyl and/or hydrolysable groups in polymer (i) is comprised between 0.01:1 and 0.6:1, where M is titanium or zirconium;

by applying a reactive interlayer to a surface of the substrate and applying pressure to sandwich the reactive interlayer between said silicone based material surface and the substrate surface and thereby causing chemically bonding of said silicone based material to said substrate.

The substantially cured or fully cured silicone based material is a substantially cured or fully cured elastomer or a substantially cured or fully cured gel. Typically given the above ratios the resulting cured silicone based material is sufficiently tacky to the touch given the presence of excess hydrolysable groups for physical adhesion to occur when the substantially cured or fully cured silicone based material is brought into contact with the substrate surface. However the physical adhesion is not strong and therefore the substantially cured or fully cured silicone based material can easily be removed e.g. peeled from the substrate surface leaving the surface of the substrate clean (i.e. free from silicone based material) (adhesive failure). It has been identified that by coating a reactive interlayer on to the substrate surface and then bringing a surface of the substantially cured or fully cured silicone based material into contact with the treated substrate surface chemical adhesion will occur resulting in a "strong" chemical bond between the two via the reactive interlayer, so that the bonded silicone elastomer/rubber is far difficult to remove from the substrate surface. If/when the silicone elastomer/rubber is removed, typically, a layer of the silicone will remain on the surface of the substrate (cohesive failure).

The reactive interlayer when applied onto a substrate surface is applied in a relatively thin coating where appropriate and is designed to adhere to the surface of a substrate to form a binding layer that is better prepared to receive the silicone based material than the substrate surface itself. Because of the relative amounts of the components the cured silicone based material contains chemical groups i.e. OH groups or hydrolysable groups which will chemically react with the reactive interlayer when they are brought into contact with each other. Hence the reactive interlayer needs to be chemically reactive with both the substrate surface and the surface of the silicone based material and as such must be chemically able to undergo condensation reactions with both the substrate surface and the surface of the silicone based material.

In a second embodiment, it was identified that when the reactive interlayer is applied onto a surface of the substantially cured or fully cured silicone based material the previously tacky surface is swiftly rendered "silky smooth" and totally non-adhesive to the substrate surface, i.e. no physical nor chemical adhesion is observed. There is therefore also provided herein a method of rendering a substantially cured or fully cured, tacky silicone based material non-adhesive (untacky) wherein said substantially cured or fully cured silicone based material is obtained by curing a condensation curable composition comprising:

(i) at least one condensation curable silyl terminated polymer having at least one, typically at least 2 hydrolysable and/or hydroxyl functional groups per molecule;

(ii) a cross-linker selected from the group of silanes having at least 2 hydrolysable groups, alternatively at least 3 hydrolysable groups per molecule group; and/or silyl functional molecules having at least 2 silyl groups, each silyl group containing at least one hydrolysable group and (iii) a condensation catalyst selected from the group of titanates, zirconates characterized in that:

the molar ratio of hydroxyl and/or hydrolysable groups in polymer (i) to hydrolysable groups from (ii) is between 0.1:1 to 4:1 and the molar ratio of M-OR functions to the sum of moisture present in the formulation and hydroxyl and/or hydrolysable groups in polymer (i) is comprised between 0.01:1 and 0.6:1, where M is titanium or zirconium; by applying a reactive interlayer to a surface of the substantially cured or fully cured silicone based material and allowing same to interact such that upon interaction between said surface and said reactive interlayer a silky smooth and non-adhesive surface is generated.

Hence in the second embodiment the reactive interlayer is, by chemically reacting with the surface of the silicone based material, blocking/reacting with the available chemically reactive groups on the surface of the silicone based material and somewhat unexpectedly generating a "silky/smooth" surface and thereby removing tackiness and thereby physical adhesion to substrates.

The substantially cured or fully cured silicone based material (i.e. elastomer or gel) is obtained by curing a condensation curable composition comprising:

(i) at least one condensation curable silyl terminated polymer having at least one, typically at least 2 hydrolysable and/or hydroxyl functional groups per molecule;

(ii) a cross-linker selected from the group of silanes having at least 2 hydrolysable groups, alternatively at least 3 hydrolysable groups per molecule group; and/or silyl functional molecules having at least 2 silyl groups, each silyl group containing at least one hydrolysable group and (iii) a condensation catalyst selected from the group of titanates, zirconates characterized in that:

the molar ratio of hydroxyl and/or hydrolysable groups in polymer (i) to hydrolysable groups from (ii) is between 0.1:1 to 4:1 and the molar ratio of M-OR functions to the sum of moisture present in the formulation and hydroxyl and/or hydrolysable groups in polymer (i) is comprised between 0.01:1 and 0.6:1, where M is titanium or zirconium.

Polymer (i) is at least one or more than one moisture/condensation curable silyl terminated polymer. Any suitable moisture/condensation curable silyl terminated polymer may be utilised including polydialkyl siloxanes, alkylphenyl siloxane, or organic based polymers with silyl terminal groups e.g. silyl polyethers, silyl acrylates and silyl terminated polyisobutylenes or copolymers of any of the above. Preferably the polymer is a polysiloxane based polymer containing at least two hydroxyl or hydrolysable groups, most preferably the polymer comprises terminal hydroxyl or hydrolysable groups. Examples of suitable hydroxyl or hydrolysable groups include:

—Si(OH)$_3$, —(R$^a$)Si(OH)$_2$, —(R$^a$)$_2$Si(OH), —R$^a$Si(OR$^b$)$_2$, —Si(OR$^b$)$_3$, —R$^a{}_2$SiOR$^b$ or —(R$^a$)$_2$Si—R$^c$—SiR$^d{}_p$(OR$^b$)$_{3-p}$ where each R$^a$ independently represents a monovalent hydrocarbyl group, for example, an alkyl group, in particular having from 1 to 8 carbon atoms, (and is preferably methyl); each R$^b$ and R$^d$ group is independently an alkyl or alkoxy group in which the alkyl groups suitably have up to 6 carbon atoms; R$^c$ is a divalent hydrocarbon group which may be interrupted by one or more siloxane spacers having up to six silicon atoms; and p has the value 0, 1 or 2.

Preferably polymer (i) has the general formula $$X^3\text{-}A\text{-}X^1 \qquad (1)$$

where X$^3$ and X$^1$ are independently selected from siloxane groups which terminate in hydroxyl or hydrolysable groups and A is a siloxane containing polymeric chain.

Examples of hydroxyl-terminating or hydrolysable groups X$^3$ or X$^1$ include —Si(OH)$_3$, —(R$^a$)Si(OH)$_2$, —(R$^a$)$_2$Si(OH), —(R$^a$)Si(OR$^b$)$_2$, —Si(OR$^b$)$_3$, —(R$^a$)$_2$SiOR$^b$ or —(R$^a$)$_2$Si—R$^c$—Si (R$^d$)$_p$(OR$^b$)$_{3-p}$ as defined above with each R$^b$ group, when present, typically being a methyl group. Preferably the X$^3$ and/or X$^1$ terminal groups are hydroxydialkyl silyl groups, e.g. hydroxydimethyl silyl groups or alkoxydialkyl silyl groups e.g. methoxydimethyl silyl or ethoxydimethyl silyl.

Examples of suitable siloxane groups in polymeric chain A of formula (I) are those which comprise a polydiorganosiloxane chain. Thus polymeric chain A preferably includes siloxane units of formula (2)

$$—(R^5{}_sSiO_{(4-s)/2})— \qquad (2)$$

in which each R$^5$ is independently an organic group such as a hydrocarbyl group having from 1 to 10 carbon atoms optionally substituted with one or more halogen group such as chlorine or fluorine and s is 0, 1 or 2. Particular examples of groups R$^5$ include methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl)ethyl or chlorocyclohexyl group. Suitably, at least some and preferably substantially all of the groups R$^5$ are methyl.

Typically the polymers of the above type will have a viscosity in the order of 1000 to 300 000 mPa·s, alternatively 1000 to 100 000 mPa·s at 25° C. measured by using a Brookfield cone plate viscometer (RV DIII) using a cone plate.

Preferred polysiloxanes containing units of formula (2) are thus polydiorganosiloxanes having terminal, silicon-bound hydroxyl groups or terminal, silicon-bound organic radicals which can be hydrolysed using moisture as defined above. The polydiorganosiloxanes may be homopolymers or copolymers. Mixtures of different polydiorganosiloxanes having terminal condensable groups are also suitable.

Polymeric chain A may alternatively be an organic based polymer with silyl terminal groups e.g. silyl polyethers, silyl acrylates and silyl terminated polyisobutylenes. In the case of silyl polyethers the polymer chain is based on polyoxyalkylene based units. Such polyoxyalkylene units preferably comprise a linear predominantly oxyalkylene polymer comprised of recurring oxyalkylene units, (—C$_n$H$_{2n}$—O—) illustrated by the average formula (—C$_n$H$_{2n}$—O—)$_y$, wherein n is an integer from 2 to 4 inclusive and y is an integer of at least four. The average molecular weight of each polyoxyalkylene polymer block may range from about 300 to about 10,000, but can be higher in molecular weight. Moreover, the oxyalkylene units are not necessarily identical throughout the polyoxyalkylene monomer, but can differ from unit to unit. A polyoxyalkylene block, for example, can be comprised of oxyethylene units, (—C$_2$H$_4$—O—); oxypropylene units (—C$_3$H$_6$—O—); or oxybutylene units, (—C$_4$H$_8$—O—); or mixtures thereof.

Other polyoxyalkylene units may include for example: units of the structure

-[—R$^e$—O—(—R$^f$—O—)$_p$-Pn-CR$^g{}_2$-Pn-O—(—R$^f$—O—)$_q$—R$^e$]— in which Pn is a 1,4-phenylene group, each R$^e$ is the same or different and is a divalent hydrocarbon group having 2 to 8 carbon atoms, each R$^f$ is the same or different and, is, an ethylene group or propylene group, each R$^g$ is the same or different and is, a hydrogen atom or methyl group and each of the subscripts p and q is a positive integer in the range from 3 to 30.

For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

The backbone of the organic polymer (A) which may contain organic leaving groups is not particularly limited and may be any of organic polymers having various backbones. The backbone preferably includes at least one selected from a hydrogen atom, a carbon atom, a nitrogen atom, an oxygen atom, and a sulphur atom because the resulting composition has excellent curability and adhesion.

Crosslinkers (ii) that can be used are generally moisture curing
- silanes having at least 2 hydrolysable groups, alternatively at least 3 hydrolysable groups per molecule group; and/or
- silyl functional molecules having at least 2 silyl groups, each silyl group containing at least one hydrolysable group.

Typically, a cross-linker requires a minimum of 2 hydrolysable groups per molecule and preferably 3 or more. In some instances, the crosslinker (ii) having two hydrolysable groups may be considered a chain extender. The crosslinker (ii) may thus have two but alternatively has three or four silicon-bonded condensable (preferably hydroxyl and/or hydrolysable) groups per molecule which are reactive with the condensable groups in organopolysiloxane polymer (i). Typically the cross-linker (ii) will only have 2 hydrolysable groups when polymer (i) has at least 3 hydroxyl-terminating or hydrolysable groups to ensure cross-linking rather than chain extension. For the sake of the disclosure herein silyl functional molecule is a silyl functional molecule containing two or more silyl groups, each silyl group containing at least one hydrolysable group. Hence, a disilyl functional molecule comprises two silicon atoms each having at least one hydrolysable group, where the silicon atoms are separated by an organic or siloxane spacer. Typically, the silyl groups on the disilyl functional molecule may be terminal groups. The spacer may be an organic or siloxane based polymeric chain.

Any suitable cross-linker (ii) may be used for example alkoxy functional silanes, oximosilanes, acetoxy silanes, acetonoxime silanes, enoxy silanes. For softer materials more than one silyl group per molecule is preferable. The crosslinker (ii) used in the moisture curable composition as hereinbefore described is preferably a silane compound containing hydrolysable groups. These include one or more silanes or siloxanes which contain silicon bonded hydrolysable groups such as acyloxy groups (for example, acetoxy, octanoyloxy, and benzoyloxy groups); ketoximino groups (for example dimethyl ketoximo, and isobutylketoximino); alkoxy groups (for example methoxy, ethoxy, and propoxy) and alkenyloxy groups (for example isopropenyloxy and 1-ethyl-2-methylvinyloxy).

Alternatively, the crosslinker (ii) may have a siloxane or organic polymeric backbone. In the case of such siloxane or organic based cross-linkers the molecular structure can be straight chained, branched, cyclic or macromolecular. Suitable polymeric crosslinkers (ii) may have a similar polymeric backbone chemical structure to polymeric chain A as depicted in formula 1 above here above but typically any such crosslinkers ii utilised will be of significantly shorter chain length than polymer i.

The crosslinker (ii) may have two but preferably has at least three or four silicon-bonded condensable (preferably hydroxyl and/or hydrolysable) groups per molecule which are reactive with the condensable groups in organopolysiloxane polymer (a). In one embodiment the cross-linker (ii) used is a disilane having up to 6 hydroxyl and/or hydrolysable groups per molecule. When the crosslinker is a silane and when the silane has three silicon-bonded hydrolysable groups per molecule, the fourth group is suitably a non-hydrolysable silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. Preferably however, the fourth silicon-bonded organic group is methyl.

Silanes and siloxanes which can be used as crosslinkers (ii) include alkyltrialkoxysilanes such as methyltrimethoxysilane (MTM) and methyltriethoxysilane, alkenyltrialkoxy silanes such as vinyltrimethoxysilane and vinyltriethoxysilane, isobutyltrimethoxysilane (iBTM). Other suitable silanes include ethyltrimethoxysilane, vinyltriethoxysilane, phenyltrimethoxysilane, alkoxytrioximosilane, alkenyltrioximosilane, 3,3,3-trifluoropropyltrimethoxysilane, methyltriacetoxysilane, vinyltriacetoxysilane, ethyl triacetoxysilane, di-butoxy diacetoxysilane, phenyl-tripropionoxysilane, methyltris(methylethylketoximo) silane, vinyl-tris-methylethylketoximo)silane, methyltris (methylethylketoximino)silane, methyltris(isopropenoxy) silane, vinyltris(isopropenoxy)silane, ethylpolysilicate, n-propylorthosilicate, ethylorthosilicate, dimethyltetraacetoxydisiloxane. The cross-linker used may also comprise any combination of two or more of the above. The cross-linker may be polymeric, with a silicone or organic polymer chain bearing alkoxy functional end groups such as 1,6-bis (trimethoxysilyl)hexane (alternatively known as hexamethoxydisilylhexane). The molar ratio of hydroxyl and/or hydrolysable groups in polymer (i) to hydrolysable groups from (ii) is between 0.1:1 to 4:1, alternatively between 0.4:1 and 2:1 or 0.5:1 and 1:1 for silanes having at least 2 hydrolysable groups, alternatively at least 3 hydrolysable groups per molecule group (sometimes referred to as monosilanes); and/or 0.5:1 to 4:1 or 0.75:1 to 1.5:1 in respect of silyl functional molecules having at least 2 silyl groups, each silyl group containing at least one hydrolysable group (sometimes referred to as "disilanes").

The composition further comprises a condensation catalyst (iii). This increases the speed at which the composition cures. The catalyst (iii) chosen for inclusion in a particular silicone sealant composition depends upon the speed of cure required. Titanate and/or zirconate based catalysts (iii) may comprise a compound according to the general formula $Ti[OR^{22}]_4$ where each $R^{22}$ may be the same or different and represents a monovalent, primary, secondary or tertiary aliphatic hydrocarbon group which may be linear or branched containing from 1 to 10 carbon atoms. Optionally the titanate may contain partially unsaturated groups. However, preferred examples of $R^{22}$ include but are not restricted to methyl, ethyl, propyl, isopropyl, butyl, tertiary butyl and a branched secondary alkyl group such as 2, 4-dimethyl-3-pentyl. Preferably, when each $R^{22}$ is the same, $R^{22}$ is an isopropyl, branched secondary alkyl group or a tertiary alkyl group, in particular, tertiary butyl. Suitable examples include for the sake of example, tetra n-butyl titanate, tetra t-butyl titanate, tetra t-butoxy titanate, tetraisopropoxy titanate and diisopropoxydiethylacetoacetate titanate. Alternatively, the titanate may be chelated. The chelation may be with any suitable chelating agent such as an alkyl acetylacetonate such as methyl or ethylacetylacetonate. Alternatively, the titanate may be monoalkoxy titanates bearing three chelating agents such as for example 2-propanolato, tris isooctadecanoato titanate. The molar ratio of M-OR functions to the hydroxyl and/or hydrolysable groups in polymer (i) is comprised between 0.01:1 and 0.5:1, where M is titanium or zirconium.

The silicone based material as hereinbefore described is typically made from the condensation curable composition which is stored in a 2 part manner. The two part compositions may be mixed using any appropriate standard two-part mixing equipment with a dynamic or static mixer and is optionally dispensed therefrom for use in the application for which it is intended. In one embodiment the condensation curable composition is stored in two parts having polymer (i) and cross-linker (ii) in one part and polymer (i) and catalyst (iii) in the other part. In an alternative embodiment the condensation curable composition is stored in two parts having cross-linker (ii) in one part and polymer (i) and catalyst (iii) in the other part. In a still further embodiment the condensation curable composition is stored in two parts having a first polymer (i) and cross-linker (ii) in one part and a second polymer (i) and catalyst (iii) in the other part.

Fillers

Preferably the condensation curable composition used does not contain a filler of any sort. In particular the composition preferably does not contain fillers that brings a significant amount of moisture in the composition. Suitable anhydrous filler may be utilised if required.

Should the need arise the composition may incorporate anhydrous fillers, for example thermally and/or electrically conductive fillers e.g. metallic fillers, anhydrous inorganic fillers and anhydrous meltable fillers, or a combination thereof. Metallic fillers include particles of metals and particles of metals having layers on the surfaces of the particles. These layers may be, for example, metal nitride layers or metal oxide layers on the surfaces of the particles. Suitable metallic fillers are exemplified by particles of metals selected from the group consisting of aluminium, copper, gold, nickel, tin, silver, and combinations thereof, and alternatively aluminium. Suitable metallic fillers are further exemplified by particles of the metals listed above having layers on their surfaces selected from the group consisting of aluminium nitride, aluminium oxide, copper oxide, nickel oxide, silver oxide, and combinations thereof. For example, the metallic filler may comprise aluminium particles having aluminium oxide layers on their surfaces.

Inorganic fillers, which are anhydrous and may be exemplified by onyx; aluminium trihydrate, metal oxides such as aluminium oxide, beryllium oxide, magnesium oxide, and zinc oxide; nitrides such as aluminium nitride and boron nitride; carbides such as silicon carbide and tungsten carbide; and combinations thereof. Further fillers may include barium titanate, carbon fibres, diamond, graphite, magnesium hydroxide, and a combination thereof.

However, whilst anhydrous fillers are preferred moisture containing fillers may be utilized for appropriate applications. In this case when such polymers are present generally excess moisture will necessitate the addition of a larger amount of catalyst to counteract/treat the moisture levels concerned.

Meltable fillers may comprise Bi, Ga, In, Sn, or an alloy thereof. The meltable filler may optionally further comprise Ag, Au, Cd, Cu, Pb, Sb, Zn, or a combination thereof. Examples of suitable meltable fillers include Ga, In—Bi—Sn alloys, Sn—In—Zn alloys, Sn—In—Ag alloys, Sn—Ag—Bi alloys, Sn—Bi—Cu—Ag alloys, Sn—Ag—Cu—Sb alloys, Sn—Ag—Cu alloys, Sn—Ag alloys, Sn—Ag—Cu—Zn alloys, and combinations thereof. The meltable filler may have a melting point ranging from 50° C. to 250° C., alternatively 150° C. to 225° C. The meltable filler may be a eutectic alloy, a non-eutectic alloy, or a pure metal. Meltable fillers are commercially available.

The shape of the thermally conductive filler particles is not specifically restricted, however, rounded or spherical particles may prevent viscosity increase to an undesirable level upon high loading of the thermally conductive filler in the composition. The average particle size of the thermally conductive filler will depend on various factors including the type of thermally conductive filler selected and the exact amount added to the curable composition, as well as the bondline thickness of the device in which the cured product of the composition will be used. In some particular instances, the thermally conductive filler may have an average particle size ranging from 0.1 micrometre to 80 micrometres, alternatively 0.1 micrometre to 50 micrometres, and alternatively 0.1 micrometre to 10 micrometres.

The thermally conductive filler may be a single thermally conductive filler or a combination of two or more thermally conductive fillers that differ in at least one property such as particle shape, average particle size, particle size distribution, and type of filler. In some embodiments, combinations of metallic and inorganic fillers, such as a combination of aluminium and aluminium oxide fillers; a combination of aluminium and zinc oxide fillers; or a combination of aluminium, aluminium oxide, and zinc oxide fillers may be used. In other embodiments, it may be desirable to combine a first conductive filler having a larger average particle size with a second conductive filler having a smaller average particle size in a proportion meeting the closest packing theory distribution curve. An example would be mixing two aluminium oxide preparations having different average particle sizes. In other embodiments, different thermally conductive filler materials with difference sizes may be used, for example, a combination of an aluminium oxide having a larger average particle size with a zinc oxide having a smaller average particle size. Alternatively, it may be desirable to use combinations of metallic fillers, such as a first aluminium having a larger average particle size and a second aluminium having a smaller average particle size. Use of a first filler having a larger average particle size and a second filler having a smaller average particle size than the first filler may improve packing efficiency, may reduce viscosity, and may enhance heat transfer.

Other optional additives includes anhydrous reinforcing and/or anhydrous extending fillers e.g. precipitated and ground silica, precipitated and ground calcium carbonate, treated silicas, glass beads, carbon black, graphite, carbon nanotubes, quartz, talc, chopped fibre such as chopped KEVLAR®, or a combination thereof, siloxane resins, filler treating agents, stabilizers (e.g. a hydrosilylation cure stabilizer, a heat stabilizer, or a UV stabilizer), adhesion promoters, a surfactant, a flux agent, an acid acceptor, a hydrosilylation inhibitor and/or an anti-corrosion additives and a combination thereof.

Siloxane Resins

Siloxane resins comprising $R^2{}_3SiO_{1/2}$ units and $SiO_{4/2}$ units, where $R^2$ is a hydroxyl or a substituted or unsubstituted monovalent hydrocarbon radical bound directly or via an oxygen atom to the silicon atom. The monovalent hydrocarbon radical typically contains up to 20 carbon atoms $R^2{}_3SiO_{1/2}$ typically from 1 to 10 carbon atoms. Examples of suitable hydrocarbon radicals for $R^2$ include alkyl radicals such as methyl, ethyl, propyl, pentyl, octyl, undecyl and octadecyl radicals; alkenyl radicals such as vinyl, allyl, and 5-hexenyl; cycloaliphatic radicals such as cyclohexyl and cyclohexenylethyl and aryl radicals such as phenyl, tolyl, xylyl, benzyl and 2-phenylethyl. Typically at least one third, alternatively at least two thirds of the $R^2$ radicals are methyl radicals. Examples of $R^2{}_3SiO_{1/2}$ units include but are not limited to $Me_3SiO_{1/2}$, $PhMe_2SiO_{1/2}$ and $Me_2ViSiO_{1/2}$ where Me, Ph and Vi denote methyl, phenyl and vinyl respectively. The siloxane resin may contain two or more of these groups. The molar ratio of the $R^2{}_3SiO_{1/2}$ units and $SiO_{4/2}$ units in the siloxane resin is typically from 0.5:1 to 1.5:1. These ratios may be measured using $Si^{29}$nmr spectroscopy, The siloxane resins may alternatively be reactive siloxane resins of the type defined as ingredient A of WO2014/124389, incorporated herein by reference.

Filler Treating Agent

The thermally conductive filler and/or the anhydrous reinforcing and/or extending filler if present, may optionally be surface treated with a treating agent. Treating agents and treating methods are known in the art, see for example, U.S. Pat. No. 6,169,142 (col. 4, line 42 to col. 5, line 2). The surface treatment of the filler(s) is typically performed, for example with a fatty acid or a fatty acid ester such as a stearate, or with organosilanes, organosiloxanes, or organosilazanes such as hexaalkyl disilazane or short chain siloxane diols. Generally the surface treatment renders the filler(s) hydrophobic and therefore easier to handle and obtain a homogeneous mixture with the other components in the composition.

Adhesion Promoter

Suitable adhesion promoters may comprise alkoxysilanes of the formula $R^{14}{}_qSi(OR^{15})_{(4-q)}$, where subscript q is 1, 2, or 3, alternatively q is 3. Each $R^{14}$ is independently a monovalent organofunctional group. $R^{14}$ can be an epoxy functional group such as glycidoxypropyl or (epoxycyclohexyl)ethyl, an amino functional group such as aminoethylaminopropyl or aminopropyl, a methacryloxypropyl, a mercapto functional group such as mercaptopropyl or an unsaturated organic group. Each $R^{15}$ is independently an unsubstituted, saturated hydrocarbon group of at least 1 carbon atom. $R^{15}$ may have 1 to 4 carbon atoms, alternatively 1 to 2 carbon atoms. $R^{15}$ is exemplified by methyl, ethyl, n-propyl, and iso-propyl.

Examples of suitable adhesion promoters include glycidoxypropyltrimethoxysilane and a combination of glycidoxypropyltrimethoxysilane with an aluminium chelate or zirconium chelate. Examples of adhesion promoters for hydrosilylation curable compositions may be found in U.S. Pat. Nos. 4,087,585 and 5,194,649. The curable composition may comprise 0.01% to 1% of adhesion promoter based on the weight of the composition. Preferably, the speed of hydrolysis of the adhesion promoter should be lower than the speed of hydrolysis of the cross-linker in order to favour diffusion of the molecule towards the substrate rather than its incorporation in the product network.

Suitable surfactants include silicone polyethers, ethylene oxide polymers, propylene oxide polymers, copolymers of ethylene oxide and propylene oxide, other non-ionic surfactants, and combinations thereof. The composition may comprise up to 0.05% of the surfactant based on the weight of the composition.

Flux Agent

The composition may comprise up to 2% of a flux agent based on the weight of the composition. Molecules containing chemically active functional groups such as carboxylic acid and amines can be used as flux agents. Such flux agents can include aliphatic acids such as succinic acid, abietic acid, oleic acid, and adipic acid; aromatic acids such as benzoic acids; aliphatic amines and their derivatives, such as triethanolamine, hydrochloride salts of amines, and hydrobromide salts of amines. Flux agents are known in the art and are commercially available.

Acid Acceptor

Suitable acid acceptors include magnesium oxide, calcium oxide, and combinations thereof. The composition may comprise up to 2% of Acid Acceptor based on the weight of the composition, if appropriate.

Anti corrosion additives, such as nitrogen/sulphur containing heterocyclic compounds containing a triazole structure, a thiadiazole structure, a benzotriazole structure, a mercaptothiozole structure, a mercaptobenzothiazole structure or a benzimidazole structure.

In one embodiment of the invention the composition used to cure the gel is a mixture of a condensation curable polymer, cross-linker and catalyst as described above in combination with a hydrosilylation curable polymer together with a suitable cross-linker and catalyst. Any suitable polymer curable via a hydrosilylation reaction pathway may be utilized. Typically the polymer is a polydialkyl siloxane or polyalkylphenyl siloxane having terminal groups containing one or more unsaturated groups (e.g. alkenyl terminated e.g. ethenyl terminated, propenyl terminated, allyl terminated ($CH_2$=$CHCH_2$—)) or terminated with acrylic or alkylacrylic such as $CH_2$=$C(CH_3)$—$CH_2$— groups Representative, non-limiting examples of the alkenyl groups are shown by the following structures; $H_2C$=$CH$—, $H_2C$=$CHCH_2$—, $H_2C$=$C(CH_3)CH_2$—, $H_2C$=$CHCH_2CH_2$—, $H_2C$=$CHCH_2CH_2CH_2$—, and $H_2C$=$CHCH_2CH_2CH_2CH_2$—. Representative, non-limiting examples of alkynyl groups are shown by the following structures; HC≡C—, HC≡CCH$_2$—, HC≡CC(CH$_3$)$_2$—, HC≡CC(CH$_3$)$_2$CH$_2$— Alternatively, the unsaturated organic group can be an organofunctional hydrocarbon such as an acrylate, methacrylate and the like such as alkenyl and/or alkynyl groups. Alkenyl groups are particularly preferred. The hydrosilylation curable polymer may therefore be further defined as an alkenyldialkylsilyl end-blocked polydialkylsiloxane which may itself be further defined as vinyldimethylsilyl end-blocked polydimethylsiloxane. Alternatively The polymer may be further defined as a dimethylpolysiloxane capped at one or both molecular terminals with dimethylvinylsiloxy groups; a dimethylpolysiloxane capped at one or both molecular terminals with methylphenylvinylsiloxy groups; a copolymer of a methylphenylsiloxane and a dimethylsiloxane capped at both one or both molecular terminals with dimethylvinylsiloxy groups; a copolymer of diphenylsiloxane and dimethylsiloxane capped at one or both molecular terminals with dimethylvinylsiloxy groups, a copolymer of a methylvinylsiloxane and a dimethylsiloxane capped at one or both molecular terminals with dimethylvinylsiloxy groups; a copolymer of a methylvinylsiloxane and a dimethylsiloxane capped at one or both molecular terminals with dimethylvinylsiloxy groups; a methyl (3,3,3-trifluoropropyl) polysiloxane capped at one or both molecular terminals with dimethylvinylsiloxy groups; a copolymer of a methyl (3,3,3-trifluoropropyl) siloxane and a dimethylsiloxane capped at one or both molecular terminals with dimethylvinylsiloxy groups; a copolymer of a methylvinylsiloxane and a dimethylsiloxane capped at one or both molecular terminals with silanol groups; a copolymer of a methylvinylsiloxane, a methylphenylsiloxane, and a dimethylsiloxane capped at one or both molecular terminals with silanol groups; or an organosiloxane copolymer composed of siloxane units represented by the following formulae: $(CH_3)_3SiO_{1/2}$, $(CH_3)_2(CH_2$=$CH)SiO_{1/2}$, $CH_3SiO_{3/2}$, $(CH_3)_2SiO_{2/2}$, $CH_3PhSiO_{2/2}$ and $Ph_2SiO_{2/2}$.

Hydrosilylation Cross-Linker

The hydrosilylation cross-linker has an average of at least 2 silicon-bonded hydrogen atoms per molecule and may be further defined as, or include, a silane or a siloxane, such as a polyorganosiloxane. In various embodiments, the hydrosilylation cross-linker may include more than 2, 3, or even more than 3, silicon-bonded hydrogen atoms per molecule. The hydrosilylation cross-linker may have a linear, a branched, or a partially branched linear, cyclic, dendrite, or resinous molecular structure. The silicon-bonded hydrogen atoms may be terminal or pendant. Alternatively, the hydrosilylation cross-linker may include both terminal and pendant silicon-bonded hydrogen atoms.

In addition to the silicon-bonded hydrogen atoms, the hydrosilylation cross-linker may also include monovalent hydrocarbon groups which do not contain unsaturated aliphatic bonds, such as methyl, ethyl, propyl, butyl, pentyl, hexyl, heptyl, octyl, decyl, undecyl, dodecyl, or similar alkyl groups; cyclopentyl, cyclohexyl, or similar cycloalkyl groups; phenyl, tolyl, xylyl, or similar aryl groups; benzyl, phenethyl, or similar aralkyl groups; or 3,3,3-trifluoropropyl, 3-chloropropyl, or similar halogenated alkyl group. Preferable are alkyl and aryl groups, in particular, methyl and phenyl groups.

The hydrosilylation cross-linker may also include siloxane units including, but not limited to, $HR^3_2SiO_{1/2}$, $R^3_3SiO_{1/2}$, $HR^3SiO_{2/2}$, $R^3_2SiO_{2/2}$, $R^3SiO_{3/2}$, and $SiO_{4/2}$ units. In the preceding formulae, each $R^3$ is independently selected from monovalent organic groups free of aliphatic unsaturation.

The hydrosilylation cross-linker may alternatively be further defined as a methylhydrogen polysiloxane capped at both molecular terminals with trimethylsiloxy groups; a copolymer of a methylhydrogensiloxane and a dimethylsiloxane capped at both molecular terminals with trimethylsiloxy groups; a dimethylpolysiloxane capped at both molecular terminals with dimethylhydrogensiloxy groups; a methylhydrogenpolysiloxane capped at one or both molecular terminals with dimethylhydrogensiloxy groups; a copolymer of a methylhydrogensiloxane and a dimethylsiloxane capped at both molecular terminals with dimethylhydrogensiloxy groups; a cyclic methylhydrogenpolysiloxane; and/or an organosiloxane composed of siloxane units represented by the following formulae: $(CH_3)_3\ SiO_{1/2}$, $(CH_3)_2HSiO_{1/2}$, and $SiO_{4/2}$; tetra(dimethylhydrogensiloxy) silane, or methyl-tri(dimethylhydrogensiloxy) silane.

It is also contemplated that the hydrosilylation cross-linker may be or include a combination of two or more organohydrogenpolysiloxanes that differ in at least one of the following properties: structure, average molecular weight, viscosity, siloxane units, and sequence. The hydrosilylation cross-linker may also include a silane. Dimethylhydrogensiloxy-terminated poly dimethylsiloxanes having relatively low degrees of polymerization (DP) (e.g., DP ranging from 3 to 50) are commonly referred to as chain extenders, and a portion of the hydrosilylation cross-linker may be or include a chain extender. In one embodiment, the hydrosilylation cross-linker is free of halogen atoms per molecule. In another embodiment, the hydrosilylation cross-linker includes one or more halogen atoms. It is contemplated that the gel, as a whole, may be free of halogen atoms or may include halogen atoms.

Hydrosilylation Catalyst

The hydrosilylation catalyst is not particularly limited and may be any known in the art. In one embodiment, the hydrosilylation catalyst includes a platinum group metal selected from platinum, rhodium, ruthenium, palladium, osmium or iridium, organometallic compounds thereof, or combinations thereof. In another embodiment, the hydrosilylation catalyst is further defined as a fine platinum metal powder, platinum black, platinum dichloride, platinum tetrachloride; chloroplatinic acid, alcohol-modified chloroplatinic acid, chloroplatinic acid hexahydrate; and complexes of such compounds, such as platinum complexes of olefins, platinum complexes of carbonyls, platinum complexes of alkenylsiloxanes, e.g. 1,3-divinyltetramethyldisiloxane, platinum complexes of low molecular weight organopolysiloxanes, for example 1,3-diethenyl-1,1,3,3-tetramethyldisiloxane, complexes of chloroplatinic acid with β-diketones, complexes of chloroplatinic acid with olefins, and complexes of chloroplatinic acid with 1,3-divinyltetramethyldisiloxane.

Alternatively, the hydrosilylation catalyst may be further defined as a rhodium compound, such as those expressed by formulae: $RhX_3[(R^4)_2S]_3$; $(R^5_3P)_2Rh(CO)X$, $(R^5_3P)_2Rh(CO)H$, $Rh_2X_2Y_4$, $H_fRh_g(En)_hCl_i$, or $Rh[O(CO)R]_{3-j}(OH)_j$, wherein each X is independently a hydrogen atom, chlorine atom, bromine atom, or iodine atom, each Y is independently a methyl group, ethyl group, or a similar alkyl group, CO, $C_8H_{14}$, or 0.5 $C_8H_{12}$; each $R^4$ is independently a methyl, ethyl, propyl, or a similar alkyl group; a cycloheptyl, cyclohexyl, or a similar cycloalkyl group; or a phenyl, xylyl or a similar aryl group; each $R^5$ is independently a methyl group, ethyl group, or a similar alkyl group; phenyl, tolyl, xylyl, or a similar aryl group; methoxy, ethoxy, or a similar alkoxy group, wherein each "En" is ethylene, propylene, butene, hexene, or a similar olefin; subscript "f" is 0 or 1; subscript "g" is 1 or 2; subscript "h" is an integer from 1 to 4; subscript "i" is 2, 3, or 4; and subscript "j" is 0 or 1.

Particularly suitable but non-limiting examples of rhodium compounds are $RhCl(Ph_3P)_3$, $RhCl_3[S(C_4H_9)_2]_3$, $[Rh(O_2CCH_3)_2]_2$, $Rh(OCCH_3)_3$, $Rh_2(C_8H_{15}O_2)_4$, $Rh(C_5H_7O_2)_3$, $Rh(C_5H_7O_2)(CO)_2$, and $Rh(CO)[Ph_3P](C_5H_7O_2)$.

The hydrosilylation catalyst may also be further defined as an iridium group compound represented by the following formulae: $Ir(OOCCH_3)_3$, $Ir(C_5H_7O_2)_3$, $[Ir(Z)(En)_2]_2$, or $[Ir(Z)(Dien)]_2$ wherein each "Z" is chlorine atom, bromine atom, iodine atom, or a methoxy group, ethoxy group, or a similar alkoxy group; each "En" is ethylene, propylene, butene, hexene, or a similar olefin; and "Dien" is (cyclooctadiene)tetrakis(triphenyl). The hydrosilylation catalyst may also be palladium, a mixture of palladium black and triphenylphosphine. The hydrosilylation catalyst and/or any of the aforementioned compounds may be microencapsulated in a resin matrix or coreshell type structure, or may be mixed and embedded in a thermoplastic organic resin powder, e.g. a methylmethacrylate resin, carbonate resin, polystyrene resin, silicone resin, or similar resin. Typically, the hydrosilylation catalyst is present/utilized in an amount of from 0.01 to 1,000 ppm, alternatively 0.1 to 500 ppm alternatively 1 to 500 ppm, alternatively 2 to 200, alternatively 5 to 150 ppm, based on the total weight of the hydrosilylation curable polymer and hydrosilylation cross-linker.

Optionally the dual cure embodiment may require the presence of a hydrosilylation stabilizer to prevent premature curing of the curable composition in the case of the embodiment having a dual cure composition including a hydrosilylation cure composition. In order to adjust speed of curing and to improve handling of the composition under industrial conditions, the composition may be further combined with an alkyne alcohol, enyne compound, benzotriazole, amines such as tetramethyl ethylenediamine, dialkyl fumarates, dialkenyl fumarates, dialkoxyalkyl fumarates, maleates such as diallyl maleate, and a combination thereof. Alternatively, the stabilizer may comprise an acetylenic alcohol. The following are specific examples of such compounds: such as 2-methyl-3-butyn-2-ol, 3-methyl-1-butyn-3-ol, 3,5-dimethyl-1-hexyn-3-ol, 2-phenyl-3-butyn-2-ol, 3-phenyl-1-butyn-3-ol, 1-ethynyl-1-cyclohexanol, 1,1-dimethyl-2-propenyl)oxy)trimethylsilane, methyl(tris(1,1-dimethyl-2-propynyloxy))silane, or similar acetylene-type compounds; 3-methyl-3-penten-1-yne, 3,5-dimethyl-3-hexen-1-yne, or similar en-yne compounds; Other additives may comprise hydrazine-based compounds, phosphines-based compounds, mercaptane-based compounds, cycloalkenylsiloxanes such as methylvinylcyclosiloxanes such as 1,3,5,7-tetramethyl-1,3,5,7-tetravinyl cyclotetrasiloxane, 1,3,5,7-tetramethyl-1,3,5,7-tetrahexenyl cyclotetrasiloxane, benzotriazole, or similar triazols. The content of such inhibitors in the hydrosilation-curable thermoconductive silicone elastomer composition may be within the range of 0.0001 to 5 parts by weight per 100 parts by weight of the hydrosilylation curable polymer.

The silicone based material as hereinbefore described can be made by intermixing the aforementioned two parts of the composition and subsequently curing the composition.

Subsequent to intermixing and in the absence of the reactive interlayer of the application of the above onto a substrate will result in two alternative scenarios depending on the state in which it is applied. If the condensation curable composition is applied on to the surface of a substrate which might, for the sake of example, be a sheet or tile or the like, before curing, it can be applied using any suitable dispenser such as for example a curtain coater, spray device, die coater, dip coater, extrusion coater, knife coater or a screen coater and is subsequently allowed to cure. Given that the cure process occurs while the composition is on the substrate surface a chemically adhesive interaction between the substrate surface and the composition may occur during the cure process.

Alternatively, the condensation curable composition may be cured in an appropriate manner and then the resulting cured silicone based material may be applied onto the substrate in the form of e.g. a sheet or the like. However, if application onto the surface of the substrate takes place subsequent to cure the adhesion of the elastomer to the substrate will be substantially of a physical adhesion type when applied directly to the substrate surface because while it will be tacky to the touch the elastomer will not significantly chemically interact with the substrate and thereby chemically adhere to the surface of the substrate. In such a situation the cured silicone based material being only physically adhered to the substrate surface is easily removable e.g. by peeling from the substrate surface.

Reactive Interlayer

Use of the reactive interlayer as herein described surprisingly enables the pre-cured silicone based material to be chemically adhered to the surface of a substrate when applied post cure resulting in a significantly stronger adhesive bond then would have previously been expected. Typically, sealant type compositions when fully cured will have minimal —OH groups or other hydrolysable groups chemically available post cure. The chemical composition of the cured silicone based material as described above possesses an excess of silanol reactive groups post cure. These are able to chemically interact with a reactive interlayer that can be used to chemically adhere the silicone based material to the substrate surface.

The reactive interlayer creates a substantially non-reversible chemical bond to a suitable treated substrate at the interface between the silicone based material surface and the substrate.

Prior to application, the reactive interlayer may be a suitable coating composition material or a layer of an uncured sealant composition which can chemically interact with both the substrate surface and the silicone based material surface which are intended to be brought into contact together.

In one embodiment, the reactive interlayer may be applied in a "wet" and/or uncured state onto a cleaned surface of a substrate and then the surface of the silicone based material is brought into contact with the substrate surface by the application of pressure such that the reactive interlayer is sandwiched between the silicone based material surface and the substrate surface and chemical adhesion develops.

The composition used to generate the silicone based material upon curing is moisture curing and given the relative amounts of the ingredients will possess an excess of silanol reactive groups. Hence the reactive interlayer is typically a composition which will need to wet the surface to which it is to be applied and needs to contain reactive groups with the aforementioned silanol reactive groups in order to form chemical adhesion there between. Use of the term chemical adhesion is intended to mean that chemical bonding occurs across the reactive interlayer generating chemical adhesion of the silicone based material to the substrate.

Any suitable coating composition may be used as the reactive interlayer but preferably the coating composition will consist or comprise an appropriate composition containing a titanate or zirconate ingredient and/or a tin (II) and tin (IV) based ingredient. The coating composition may additionally contain silanes having groups which will chemically interact with the excess of silanol groups in the silicone based material, i.e. containing various functional groups such as amines, thiol, epoxy, alkoxy, acetoxy, oximino to enhance adhesion on various substrates.

The reactive interlayer may for example be a suitable coating composition comprising:
from 0.01 to 90% by weight, alternatively 0.5 to 75% by weight, alternatively 1 to 50% by weight, alternatively 1 to 20% by weight of a titanate, zirconate, tin II or Tin IV catalyst,
from 0 to 90% by weight alternatively 0.5 to 75% by weight, alternatively 1 to 50% by weight, alternatively 1 to 20% by weight of one or more silanes having at least two hydrolysable groups and optionally one or more alternative functional groups for create chemical bonds with substrate surfaces,
from 5 to 90% by weight alternatively 20 to 80% by weight, alternatively 40 to 70% by weight, of a silicone solvent or an organic solvent;

with the total weight % of the coating composition being 100 weight %.

Titanate/Zirconate

Organometallic reagents that may be used in the coating composition according to the present disclosure include organotitanate and/or organozirconate. Organotitanate may include, but is not limited to, tetrabutyl titanate, tetrapropoxy titanate, tetraethoxy titanate, tetraamyl titanate, titanium di-isopropoxy bis ethylacetoacetate, di-isopropoxy bis acetylacetonate, and any combination thereof. Organozirconate may include, but is not limited to, zirconium acetylacetonate.

Optionally Aluminum organometallic compounds may also be included in such a composition for example but not limited to, aluminum acetylacetonate.

Organotin Compound

Suitable organotin compounds which may be the basis for primer according to the present disclosure may include, but is not limited to, alkyltin ester compounds such as Dibutyltin dioctoate, Dibutyltin dimaleate, butyltin 2-ethylhexoate, dimethyl tin di-neodecyl ester, or dibutyltin dilaurate, dibutyl tin acetate and dibutyl tin 2-ethyl hexanoate, and any combination thereof.

Silanes

Silanes, when present in the coating composition for use as the reactive interlayer as described herein include silanes with at least two hydrolyzable groups per molecule or alternatively at least three hydrolysable groups which hydrolysable groups are chemically reactive. When the silane has three silicon-bonded hydrolysable groups per molecule; the fourth group is suitably a non-hydrolysable silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. Preferably however, the fourth silicon-bonded organic group is methyl.

Specific examples of suitable silanes include but are not limited to, alkyltrialkoxysilanes such as methyltrimethoxysilane (MTM) ethyltrimethoxysilane and methyltriethoxysilane, alkenyltrialkoxy silanes such as vinyltrimethoxysilane and vinyltriethoxysilane, isobutyltrimethoxysilane (iBTM). Other suitable silanes include, phenyltrimethoxysilane, alkoxytrioximosilane, alkenyltrioximosilane, 3,3,3-trifluoropropyltrimethoxysilane, methyltris(methylethylketoximo)silane, vinyl-tris-methylethylketoximo)silane, methyltris(methylethylketoximino)silane, methyltris(isopropenoxy)silane, vinyltris(isopropenoxy)silane, (ethylenediaminepropyl)trimethoxysilane, vinyl trimethoxysilane, tetraalkylorthosilicate having the general formula $SiOR_4$, tetraethoxysilane, mercapto functional-silanes, glycidyloxypropyl trimethoxysilane, amino functional silanes and any combination thereof.

The coating composition which may be used as the reactive interlayer herein may additionally include other ingredients for example one or more polyorganosiloxane resin(s) which may be depicted using the following general formula of the following groups $(R^1R^2R^3SiO_{1/2})_a$ $(R^4R^5SiO_{2/2})_b(R^6SiO_{3/2})_c(SiO_{4/2})_d$. (often referred to as M, D, T, or Q units respectively) with, $0<a<1$, $b\geq0$, $c\geq0$, $0<d<1$, $a+b+c+d=1$, and $0.2<a/d<3.5$, (when a, b, c and d are mole fractions) with the resin having a weight-average molecular weight between about 1,000 and about 100,000, on a standard polystyrene basis by gel permeation chromatography.

Each $R^1$-$R^6$ is independently selected from a monovalent hydrocarbon groups, a carbinol group, an alkoxy group (preferably methoxy or ethoxy) or an amino group. Suitable exemplary monovalent hydrocarbon groups include, but are not limited to, alkyl groups such as methyl, ethyl, propyl, pentyl, octyl, undecyl, and octadecyl; alkenyl groups, cycloalkyl groups such as cyclopentyl and cyclohexyl; and aryl groups such as phenyl, tolyl, xylyl, benzyl, and 2-phenylethyl, and any combination thereof. In one embodiment, the organopolysiloxane is free of halogen atoms. In another embodiment, the organopolysiloxane includes one or more halogen atoms. Halogenated hydrocarbon groups include, but are not limited to, 3,3,3-trifluoropropyl, 3-chloropropyl, dichlorophenyl, and 6,6,6,5,5,4,4,3,3-nonafluorohexyl groups; and combinations thereof. The cyano-functional groups may include cyanoalkyl groups such as cyanoethyl and cyanopropyl groups, and combinations thereof.

Suitable alkenyl groups contain from 2 carbon atoms to about 6 carbon atoms and may be exemplified by, but not limited to, vinyl, allyl, and hexenyl. The alkenyl groups in this component may be located at terminal, pendant (non-terminal), or both terminal and pendant positions. $R^1$-$R^6$ do not include acrylate functional groups. One particularly preferred resin for the present invention is an MQ resin which comprises substantially only M units ($R^1R^2R^3SiO_{1/2}$) and Q units ($SiO_{4/2}$). But may contain minor amounts of D units ($R^4R^5SiO_{2/2}$) and/or T units ($R^6SiO_{3/2}$). The polyorganosiloxane resin may have a weight-average molecular weight between about 1,000 and about 100,000, on a standard polystyrene basis by gel permeation chromatography. The polyorganosiloxane resin may have less than about 0.7% of hydroxyl groups bonded to silicon atoms A variety of solvents may be used in the coating composition which is suitable as the reactive interlayer herein. Solvents that have gained VOC exempt status are preferred. Solvents that may be used include, but are not limited to, tert butyl acetate, methyl acetate, ethyl acetate, n-butyl acetate, methyl formate, ethyl formate, and any combination thereof. Preferably any solvent(s) utilized alone or in combination will be miscible or substantially miscible with the other ingredients in the coating composition. For example the solvent may be tert butyl acetate alone or in combination with one of the other solvents listed above in a ratio of tert butyl acetate:other solvent of from 70:30 to 95:5.

The coating composition useable as the reactive interlayer may be applied onto the substrate surfaces in a variety of different ways. One method includes applying the coating composition with a lint-free cloth to maximize the coverage rate and to obtain a consistent film thickness. It is also possible to use a brush or any other acceptable tool known to those of ordinary skill in the art to apply the coating composition according to the present disclosure.

Following application, were the coating composition being used merely as a primer it would be allowed to dry which might take from about 5 to about 60 minutes or less at ambient conditions, depending on the volatility of the solvent used in the composition. However, it has been identified that an almost immediate chemical adhesive bond is obtained when the reactive interlayer is applied to the silicone based material surface or the substrate surface or indeed both of said surfaces and then within the space of a short time, e.g. less than 10 minutes, preferably less than 5 minutes the silicone based material surface is placed onto the substrate surface and pressure applied to sandwich the reactive interlayer between the elastomer or gel surface and the substrate surface. It is preferred that the reactive interlayer be applied onto the surface of the substrate or both the surface of the substrate and the cured silicone based material.

It has further been identified that in the event that the reactive interlayer is allowed to dry on the substrate surface onto which it was first applied and then subsequently the silicone based material surface is brought into contact with the substrate surface and pressure applied to sandwich the reactive interlayer between the silicone based material surface and the substrate surface an initial physical adhesion is typically identified there between but after a time period of 1 to 2 days or more chemical bonding develops.

In the event that the reactive interlayer is a moisture cure sealant composition, any suitable composition may be utilized and may include one part and two part silicone RTV elastomer compositions which may be titanate/zirconate or tin catalyzed.

Such moisture cure sealant compositions for use as the reactive interlayer may comprise:
at least one condensation curable silyl terminated polymer having at least one, typically at least 2 hydrolysable and/or hydroxyl functional groups per molecule (ai);
a cross-linker (aii) and
a suitable condensation catalyst (aiii) as defined above. The amount of crosslinker present in the composition will depend upon the particular nature of the cross-linker and in particular, the molecular weight of the molecule selected.

The moisture cure sealant compositions for use as the reactive interlayer suitably contain crosslinker (aii) in at least a stoichiometric amount as compared to the polymeric material described above. Compositions may contain, for example, from 2-30% w/w of crosslinker, but generally from 2 to 10% w/w. Acetoxy crosslinkers may typically be present in amounts of from 3 to 8% w/w preferably 4 to 6% w/w whilst oximino cross-linkers, which have generally higher molecular weights will typically comprise from 3-8% w/w.

Preferably the catalyst, component (aiii), in moisture cure sealant compositions for use as the reactive interlayer will be present in an amount of from 0.3 to 6 parts by weight per 100 parts by weight of polymer (i), i.e. from about 0.2 to 2 weight % of the composition component (aiii) may be present in an amount of greater than 6 parts by weight in cases where chelating agents are used.

The moisture cure sealant compositions for use as the reactive interlayer may contain, as optional constituents, other ingredients which are conventional to the formulation of silicone rubber sealants and the like. For example, the compositions will normally contain one or more finely divided, reinforcing fillers such as high surface area fumed and precipitated silicas including rice hull ash and to a degree calcium carbonate as discussed above, or additional non-reinforcing fillers such as crushed quartz, diatomaceous earths, barium sulphate, iron oxide, titanium dioxide and carbon black, talc, wollastonite. Other fillers which might be used alone or in addition to the above include aluminite, calcium sulphate (anhydrite), gypsum, calcium sulphate, magnesium carbonate, clays such as kaolin, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite Aluminium oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluninosilicates comprise ground silicate minerals, such as but not limited to, sillimanite; $Al_2SiO_5$; mullite; $3Al_2O_3.2SiO_2$; kyanite; and $Al_2SiO_5$ The ring silicates group comprises silicate minerals, such as but not limited to, cordierite and $Al_3(Mg,Fe)_2[Si_4AlO_{18}]$. The chain silicates group comprises ground silicate minerals, such as but not limited to, wollastonite and $Ca[SiO_3]$.

The sheet silicates group comprises silicate minerals, such as but not limited to, mica; $K_2Al_{14}[Si_6Al_2O_{20}](OH)_4$; pyrophyllite; $Al_4[Si_8O_{20}](OH)_4$; talc; $Mg_6[Si_8O_{20}](OH)_4$; serpentine for example, asbestos; Kaolinite; $Al_4[Si_4O_{10}](OH)_8$; and vermiculite.

In addition, a surface treatment of the filler(s) may be performed, for example with a fatty acid or a fatty acid ester such as a stearate, or with organosilanes, organosiloxanes, or organosilazanes hexaalkyl disilazane or short chain siloxane diols to render the filler(s) hydrophobic and therefore easier to handle and obtain a homogeneous mixture with the other sealant components The surface treatment of the fillers makes the ground silicate minerals easily wetted by the silicone polymer. These surface modified fillers do not clump, and can be homogeneously incorporated into the silicone polymer. This results in improved room temperature mechanical properties of the uncured compositions. Furthermore, the surface treated fillers give a lower conductivity than untreated or raw material.

The proportion of such fillers when employed will depend on the properties desired in the elastomer-forming composition and the cured elastomer. Usually the filler content of the composition will reside within the range from about 5 to about 800 parts by weight, preferably from 25 to 400 parts by weight per 100 parts by weight of the polymer excluding the diluent portion.

Other ingredients which may be included in the moisture cure sealant compositions for use as the reactive interlayer include but are not restricted to co-catalysts for accelerating the cure of the composition such as metal salts of carboxylic acids and amines; rheological modifiers; Adhesion promoters, pigments, Heat stabilizers, Flame retardants, UV stabilizers, Chain extenders, electrically and/or heat conductive fillers, Fungicides and/or biocides and the like (which may suitably by present in an amount of from 0 to 0.3% by weight), water scavengers, (typically the same compounds as those used as cross-linkers or silazanes.

The moisture cure sealant composition used as the reactive interlayer may be applied onto the silicone based material and/or substrate surfaces in any suitable manner known to the skilled man. Preferably the reactive interlayer will only be a few mm in thickness.

Again, it has been identified that an almost immediate chemical adhesive bond is obtained when the reactive interlayer is applied to the silicone based material surface or the substrate surface and then within the space of a short time, e.g. less than 10 minutes, preferably less than 5 minutes the silicone based material surface is placed onto the substrate surface and applying pressure to sandwich the reactive interlayer between the elastomer or gel surface and the substrate surface.

It has further been identified that in the event that the reactive interlayer is allowed to dry on the substrate surface onto which it was first applied and then subsequently the silicone based material surface is brought into contact with the substrate surface and pressure applied to sandwich the reactive interlayer between the elastomer or gel surface and the substrate surface initial physical adhesion is observed but after a time period of 1 to 2 days or more chemical bonding develops.

One use for the present method is if the silicone based material is functioning e.g. as a tile adhesive which is chemical bonded to the tile and has a release paper or the like preventing unwanted adhesion until in its correct position identified by the user. In use, the release liner would be removed, reactive interlayer would be applied onto the silicone based material surface and/or the substrate surface, e.g. a wall or floor or the like and subsequently the tile is put into position by the user with pressure applied resulting with chemical adhesion of the tile to the substrate surface with the reactive interlay sandwiched between the two. Any application of this type may be used to generate chemical adhesion between the silicone based material surface and the surface of the substrate to which it has been brought into contact.

It is also envisaged that chemical adhesion could be restricted to certain areas of the interface between the silicone based material and the substrate surface with areas not coated with the reactive interlayer only having a physical adhesion and therefore potentially removable unlike the region chemically bonded via the reactive interlayer applied thereto.

In the case where physical adhesion may only be necessary for e.g. dismantling, parts and repair, then the interlayer can be applied in selective locations. One can consider a process where the interlayer is applied at specific areas on the substrate before applying the cured silicone based material. It is then removed from the substrate at the areas where the interlayer was not applied to make for instance stripes, circles or any shape desired. The cured gel is easily removed from untreated areas but remained adhered to the substrate surface in areas where the reactive interlayer had been applied.

The silicon based material can be selectively adhered onto a substrate by applying reactive interlayers to specified areas of a substrate surface and applying the elastomer there to. The elastomer may be peeled off the substrate other than in areas where the reactive interlayer has been applied i.e. the elastomer is selectively removed from certain areas of a substrate surface but is left in place on the substrate in areas previously treated with the reactive interlayer material. The reactive interlayer in such cases may be applied onto the substrate surface using a printer or the like which is able to apply a pattern of reactive interlayer onto the substrate surface prior to application of the cured silicone based material. If required this use of a reactive interlayer may be utilised to effectively chemically adhere silicone based material to two or more substrates, e.g. if it were required to have a plate or tile or the like of silicone based material sandwiched between two substrates. In this case the face of each substrate intended for adhesion to the silicone based material would be first treated with reactive interlayer and then subsequently brought into contact with the tile or the like of silicone based material. This application might be used perhaps in some form of dampening or cushioning application. Obviously if required this could be used to facilitate a series of the same or different substrates to be adhered together separated by e.g. a plate or tile of silicone based material.

The method described herein is useful in particular for producing a strong adhesive bond between the substrate and the silicone based material (laminate) by way of the intermediate reactive interlayer which is strongly adhered to the silicone based material and a surface of a plastic film substrate and in which the durability of the adhesion is also excellent, and can be utilized to produce laminates in a wide range of fields such as for the sake of example Lamination for construction panels made of glass, concrete, stones, metal, wood, Lamination for electronics such as displays. Other applications might include use in the assembly of parts in electronics, automotive, construction applications. One particular use for products made by the method of this invention may be as a pre cured spacer to assemble transparent devices such as insulating glass units, electronic displays, weather sealants, optical devices, light emitting diodes, lenses etc.

Hence, the substrates may include glass sheets for flat panel displays (LED, LCD screens), glass panels for facades or cars, metal, plastic, wood, concrete or stone plates for construction, automotive, electronics etc. metal, plastic, wood, concrete fixations, like hooks, screws, nuts.

Though there are no particular limitations on the applications of laminates obtained using the coating composition for silicone pressure-sensitive adhesives of the present invention, the representative applications of laminates are exemplified as silicone pressure-sensitive adhesive tapes or sheets. And, such laminates are useful and preferred as heat-resistant pressure-sensitive adhesive tapes, pressure-sensitive adhesive tapes for electrical insulation service, heat-seal pressure-sensitive adhesive tapes, pressure-sensitive adhesive tapes for masking applications, and so forth.

Second Embodiment

In the second embodiment, it was identified that when the reactive interlayer is applied onto a surface of the substantially cured or fully cured silicone based material the previously tacky surface is swiftly rendered "silky smooth" and totally un-adherable to the substrate surface, i.e. no physical nor chemical adhesion to substrates is observed.

The direct application of the interlayer onto the surface of the cured gel or elastomer may facilitate the removability of the product from the substrate. This can be useful to remove physical tack for example to facilitate the peeling off of a liner. Hence, the reactive interlayer may be used to remove residual tackiness from a moisture cured silicone material when the reactive interlayer is first applied onto the surface of the silicone material.

Examples of the First Embodiment

The compositions used for examples were as follows with viscosity values at 25° C. measured by using a Brookfield cone plate viscometer (RV DIII) using a cone plate. Compositions were applied at 23-C and 50% relative humidity.

TABLE 1

Base Composition Part

| | A | B | C | D | E Comparative example Tin(IV) |
|---|---|---|---|---|---|
| OH terminated polydimethylsiloxane (viscosity ca 50,000 mPa · s) | 97.4 | | | | |
| OH terminated polydimethylsiloxane (viscosity ca 13,500 mPa · s) | | 91.6 | 99.1 | | 96.75 |
| Trimethoxysilyl terminated polydimethylsiloxane (viscosity ca 56,000 mPa · s) | | 8.4 | | 100 | |
| Nanocyl NC 7000 carbon nanotubes | 1.6 | | 0.9 | | |
| 1,6 bis(trimethoxysilyl) hexane | 1.0 | | | | 3.25 |

TABLE 2

Catalyst Composition Part

| | A | B | C | D | E Comparative example Tin (IV) |
|---|---|---|---|---|---|
| OH terminated polydimethylsiloxane (viscosity ca 50,000 mPa · s) | 49.39 | | | | |
| OH terminated polydimethylsiloxane (viscosity ca 13,500 mPa · s) | 49.39 | | | | 99.42 |
| OH terminated polydimethylsiloxane (viscosity ca 4,000 mPa · s) | | | | 94.9 | |
| Trimethoxysilyl terminated polydimethylsiloxane (viscosity ca 56,000 mPa · s) | | 99.26 | 99.7 | | |
| Nanocyl NC 7000 carbon nanotubes | 1.01 | | | | |
| Cabosil LM150 fumed silica | | | | 4.7 | |
| tetra n-butyl titanate | 0.22 | 0.74 | 0.3 | | |
| Dimethyltin neodecanoate | | | | | 0.58 |

The mixing ratio of the base part to the catalyst part was 1:1 for formulation A, 10 to 1 for formulation B, 1.75 to 1 for formulation C, 1 to 1 for formulation D and 1:1 for formulation E.

EXAMPLES

Example 1 Formulation A

A float glass substrate was treated with DOW CORNING® 1200 OS PRIMER CLEAR a commercial Primer from Dow Corning Corporation of Michigan, USA, which has been used according to the manufacturer's instructions and used as reactive interlayer.

Strips of pre-cured formulation A material (approx. 1 cm width, 5-6 cm in length and 2 mm thick were attached to above described substrate at different times after the application of OS1200.

The adhesion of the strips to the float glass substrate was examined after approximately one hour and Table 3 summarizes the results.

Y means that a strip was well adhered to the glass plates and that attempts to remove it resulted in a cohesive failure within the strip
N means that the strip was easily removable (peeled off)-adhesive failure) from the glass substrate.

TABLE 3

| Time upon treatment with OS1200 | Result |
|---|---|
| <1 min | Y |
| 5 | Y |
| 10 | Y |
| 15 | |
| 20 | N/Y |
| 30 | N |
| COMPARATIVE Example 1(no reactive interlayer on substrate) | Does not stick and removed adhesively |

Example 2

Cured materials were prepared from compositions A, B and C as depicted in Tables 1 and 2. Strips of approx. 12 cm length by 2 cm width and 2 mm thickness were adhered to glass plates. Half of the surface of these plates was pre-treated with DOW CORNING® 1200 OS PRIMER CLEAR, which serves as reactive interlayer. The DOW CORNING® 1200 OS PRIMER CLEAR was used according to the manufacturer's instructions. The strips were brought into contact with the glass substrate within 2 minutes of the application of DOW CORNING® 1200 OS PRIMER CLEAR thereon.

Upon inspection it was noticed that the strips peel adhesively from the part which has not been coated with DOW CORNING® 1200 OS PRIMER CLEAR (i.e. adhered by physical adhesion). In contrast, it was impossible to detach the strips from the part treated with the reactive interlayer without breaking the strip itself (i.e. adhered by chemical adhesion).

Example 3

Elastomer/gel materials of formulation D as well as a Sn-cure elastomer formulation E (comparative example) were cured in moulds to form circular 1-cm thick articles. These articles were adhered to stainless steel plates (substrates). Half the surface of these plates was pre-treated with DOW CORNING® 1200 OS PRIMER CLEAR, which served as a reactive interlayer. The articles were attached to the steel plates within 2 minutes of the application of DOW CORNING® 1200 OS PRIMER CLEAR Results are summarized in table 4.

TABLE 4

| Cured material | E Sn IV based elastomer (comparative example) | D |
|---|---|---|
| Adhesion to untreated substrate surface (no reactive interlayer) | Adhesive failure, does not stick | Adhesive failure, does not stick |
| Adhesion to substrate treated with reactive interlayer | Adhesive failure, does not stick | Adhesion, cohesive failure |

Example 4

The experiment described in example 3 was repeated using an aluminum substrate. The cured material used was a 5 cm by 1 cm cured strip of composition C as depicted in Tables 1 and 2 above. Upon inspection it was determined that the strip did not adhere to the part of the aluminum substrate surface which had not been pre-treated with the reactive interlayer and as such due to physical nature of the adhesion these were easily detached (peeled off). In contrast, it was impossible to detach the strip from the part of the aluminium substrate surface pre-treated with the reactive interlayer (DOW CORNING® 1200 OS PRIMER CLEAR). The strip itself broke cohesively due to the chemical nature of adhesion to the substrate surface.

Example 5

The surface of a stainless steel plate (approx. 10×15 cm) was divided in three areas. The three areas were treated as follows:
(1) no treatment
(2) DOW CORNING® 1200 OS PRIMER CLEAR (3) primer DOW CORNING® OS 3 in 1 primer/cleaner.

The two primers were used as reactive interlayers and were applied according to the manufacturer's instructions.

A strip of pre-cured composition B, as depicted in Tables 1 and 2, which was the same size as the steel plate and a thickness of about 2 mm was cut and carefully placed on the plate. After approximately 70 hours attempts were made to remove the elastomer strip from the plate. Only physical adhesion (clean peel) was observed on the part of the plate not treated with primer. The other two parts of the plate were strongly bound (chemically) to formulation B and a clean detachment was impossible. The strongest adhesion was observed for the part of the surface primed with DOW CORNING® 1200 OS PRIMER CLEAR.

Example 6

Cured materials were prepared by mixing the two components of the composition together in a Base:curing agent weight ratio of 1:1. The base component was:
  a 2,000 mPa·s (at 25° C.) silanol terminated polydimethyl siloxane. The curing agent components were:
  100 weight parts of a 2,000 mPa·s trimethoxysilyl terminated polydimethylsiloxane (at 25° C.) and 0.2 weight parts of tetra-n-butyl titanate.

The material was mixed in a speedmixer 4 times 30 seconds at a speed of 2300 rpm. The material was poured into a PVC U-shaped profile with internal dimension 18×5 mm² and was allowed to cure for 7 days. The resulting cured material was applied on glass panes which had been primed several minutes earlier using Dow Corning® 1200 OS primer.

Figure 1:
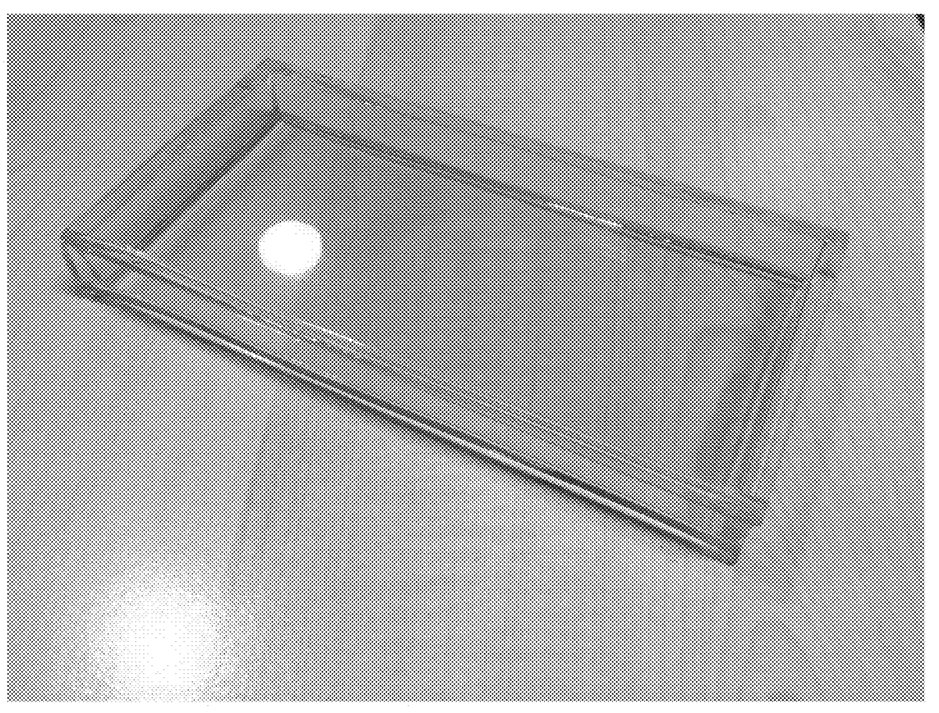
FIG. 1 is a photograph depicting a glass unit having two panes of glass separated by a continuous ribbon of cured material adhered to the periphery of each of the glass panes effectively functioning as spacer between the two panes of glass.

An example of this is provided as FIG. 1 which depicts two panes of glass separated by a continuous ribbon of the cured material adhered to the periphery of the of each glass panes effectively functioning as spacer between the two panes of glass. The upper surface of the lower glass pane depicted and the lower surface of the upper glass pane were coated around their peripheries with Dow Corning® 1200 OS primer which was allowed to dry for approximately 30 minutes.

A pre-measured ribbon of cured material as hereinbefore described was applied to the periphery of the upper surface of the lower glass pane and subsequently the lower surface of the upper pane of glass was adhered to the cured material in the regions previously primed. Almost immediately after construction the glass unit depicted in FIG. 1 could be moved and handled without impairing the structure of the construction because of the strength of the bonds formed as described herein.

Example 7

H-shaped samples of the pre-cured silicone, based on the composition in example 6, were moulded in a 2 meter long PVC U-shaped profile with internal dimension 18×5 mm² and allowed to cure at room temperature for 7 days. 50 mm long sample pieces of this moulded product were prepared (approximate dimensions: 50×18×5 mm³). Glass pieces having 50×70×4 mm³ were primed on one surface with Dow Corning® 1200 OS primer and left for about 30 minutes. The H-shaped samples of the pre cured silicone were then applied on the primed glass alongside the 50×5 mm² surface area on both surfaces of the pre cured silicone, leading to tensile H-pieces units.

H-piece samples were also applied to the unprimed glass surfaces following the above process excepting the application of primer. As previously explained, without the use of the primer the H shaped sample pieces showed minimal or no adhesion to the glass surface because they have no structural strength to adhere to the glass part.

Unlike the above, H-shaped samples of the pre-cured silicone material adhered to the primed glass surface were adhered to the primed glass surface almost immediately after application. Such sample pieces were tested for physical characteristics using a Zwick tensiometer.

It was noted that H-shaped samples, tested 20 minutes after application to a primed glass surface as described above, exhibit an immediate green strength of about 0.02 MPa but adhesive failure is observed, while H-shaped samples tested 7 days after application gave comparatively higher tensile strength results and exhibited cohesive failure. The results of these physical tests are provided in Table 5 below.

TABLE 5

H pieces on glass cured after 7 days

| Time after application | Mode of failure | Tensile Strength (MPa) | Elongation at break (%) | Modulus at 12.5% elongation |
|---|---|---|---|---|
| 20 minutes after application | Adhesive failure | 0.02 | 6 | — |
| 20 minutes after application | Adhesive failure | 0.03 | 8 | — |
| 20 minutes after application | Adhesive failure | 0.04 | 11 | — |
| 7 day after application | Cohesive failure | 0.08 | 26 | 0.04 |
| 7 day after application | Cohesive failure | 0.06 | 26 | 0.04 |
| 7 day after application | Cohesive failure | 0.05 | 22 | 0.04 |

Example 8

H-shaped samples of the pre-cured silicone, based on the composition in example 6, were molded in a 2 meter long PVC U-shaped profile with internal dimension 18×5 mm² and allowed to cure at room temperature for 7 days. 50 mm long sample pieces of this molded product were prepared (approximate dimensions: 50×18×5 mm³). Pieces of Plexiglass (PMMA), Polyethylene terephthalate (PET), Polystyrene (PS), Polyvinylchloride (PVC), aluminum mill finished (Al MF), anodized aluminum (Al AN) having 50×70×4 mm³ were primed on one surface (to be contacted by the product) with Dow Corning® 1200 OS primer and left for about 30 minutes. The H-shaped samples of the pre cured silicone were then applied on the primed glass alongside the 50×5 mm² surface area on both surfaces of the pre cured silicone, leading to tensile H-pieces units. The H-pieces were left for 7 days at 23° C. 50% relative humidity prior to be tested As previously explained, without the use of the primer the pieces showed minimal or no adhesion to the substrates surface.

Unlike the above, as can be seen from Table 6 below, H-shaped samples of the pre-cured silicone material adhered to the primed surfaces were adhering almost immediately after application. Such sample pieces were tested for physical characteristics using a Zwick tensiometer.

TABLE 6

| Specimen | Mode of failure | Tensile Strength (MPa) | Elongation at break (%) | Modulus at 12.5% elongation |
|---|---|---|---|---|
| PMMA sp1 | Cohesive failure | 0.105 | 38 | 0.043 |
| PMMA sp2 | Cohesive failure | 0.085 | 28 | 0.044 |
| PMMA sp3 | Cohesive failure | 0.105 | 40 | 0.041 |
| PET sp1 | Cohesive failure | 0.11 | 44 | 0.037 |
| PET sp2 | Cohesive failure | 0.103 | 38 | 0.039 |
| PET sp3 | Cohesive failure | 0.097 | 36 | 0.036 |
| PS sp1 | Cohesive failure | 0.089 | 33 | 0.038 |
| PS sp2 | Cohesive failure | 0.103 | 40 | 0.038 |
| PS sp3 | Cohesive failure | 0.096 | 41 | 0.035 |
| PVC sp1 | Cohesive failure | 0.097 | 38 | 0.038 |
| PVC sp2 | Cohesive failure | 0.106 | 40 | 0.039 |
| PVC sp3 | Cohesive failure | 0.092 | 36 | 0.038 |
| Al MF sp1 | Cohesive failure | 0.095 | 38 | 0.035 |
| Al MF sp2 | Cohesive failure | 0.097 | 41 | 0.03 |
| Al MF sp3 | Cohesive failure | 0.09 | 40 | 0.032 |
| Al AN sp1 | Cohesive failure | 0.098 | 32 | 0.047 |
| Al AN sp2 | Cohesive failure | 0.097 | 38 | 0.041 |
| Al AN sp3 | Cohesive failure | 0.101 | 38 | 0.043 |

As it can be seen, this technique can be used to bond various substrates, not only glass, but also plastics and metals.

Example of the Second Embodiment

DOW CORNING® 1200 OS PRIMER CLEAR was applied onto the surface of cured samples of compositions A, B and C as depicted in Tables 1 and 2 above. As seen above one would expect these silicone based materials would at least physically stick to most substrates because of their naturally tacky nature. Immediately after its application, the surface of the material is observed to become non tacky to the touch and the resulting coated material does not stick anymore to any substrates even when applying pressure on the silicone based materials.

The invention claimed is:
1. A method of adhering a cured silicone based material to a substrate surface, said method comprising:
applying a reactive interlayer to the substrate surface; and
applying pressure to sandwich the reactive interlayer between a surface of the silicone based material and the substrate surface, thereby chemically bonding the silicone based material to the substrate;

wherein the cured silicone based material is obtained by curing a condensation curable composition comprising:
(i) at least one condensation curable silyl terminated polymer having at least one hydrolysable and/or hydroxyl functional group(s) per molecule;
(ii) a cross-linker selected from the group consisting of
silanes having at least two hydrolysable groups per molecule; and/or
silyl functional molecules having at least two silyl groups, each silyl group containing at least one hydrolysable group; and
(iii) a condensation catalyst selected from the group consisting of titanates and zirconates; and
wherein
the molar ratio of hydroxyl and/or hydrolysable group(s) in polymer (i) to hydrolysable groups from cross-linker (ii) is between 0.1:1 and 4:1, and
the molar ratio of M-OR functions to the sum of moisture present in the formulation and hydroxyl and/or hydrolysable group(s) in polymer (i) is between 0.01:1 and 0.6:1, where M is titanium or zirconium and R is an aliphatic hydrocarbon group.

2. The method in accordance with claim 1, wherein the condensation curable composition is stored in two parts having cross-linker (ii) and optionally polymer (i) in one part and polymer (i) and catalyst (iii) in the other part or in two parts having a first polymer (i) and cross-linker (ii) in one part and a second polymer (i) and catalyst (iii) in the other part.

3. The method in accordance with claim 2, wherein the two parts of the condensation curable composition are intermixed and cured.

4. The method in accordance with claim 1, wherein the silicone based material is a substantially cured or fully cured elastomer or a substantially cured or fully cured gel.

5. The method in accordance with claim 1, wherein the reactive interlayer is chemically reactable with the substrate surface and/or the surface of the silicone based material.

6. The method in accordance with claim 1, wherein the reactive interlayer is a coating composition material or a layer of an uncured sealant composition which can chemically interact with the substrate surface and/or the surface of the silicone based material.

7. The method in accordance with claim 6, wherein the reactive interlayer is a moisture curable sealant composition comprising:
at least one condensation curable silyl terminated polymer having at least one hydrolysable and/or hydroxyl functional group(s) per molecule (ai);
a cross-linker (aii); and
a condensation catalyst (aiii).

8. The method in accordance with claim 1, wherein reactive interlayer is applied in a wet and/or uncured state onto a cleaned surface of a substrate and then a facing surface of the silicone based material is brought into contact with the substrate surface by the application of pressure such that the reactive interlayer is sandwiched between the surface of the silicone based material and the substrate surface and chemical adhesion develops.

9. The method in accordance with claim 1, wherein the reactive interlayer is a coating composition comprising a titanate or zirconate ingredient and/or a tin (II) and tin (IV) based ingredient and optionally silanes having groups which will chemically interact with excess silanol groups in the silicone based material.

10. The method in accordance with claim 9, wherein the chemically interactive groups are present and selected from the group consisting of amines, thiol, epoxy, alkoxy, acetoxy, and oximino to enhance adhesion on various substrates.

11. The method in accordance with claim 1, wherein the reactive interlayer is a coating composition comprising:
from 0.01 to 90% by weight of a titanate, zirconate, tin (II) or tin (IV) catalyst;
from 0 to 90% by weight of one or more silanes having at least two hydrolysable groups and optionally one or more alternative functional groups to create chemical bonds with substrate surfaces; and
from 5 to 90% by weight of a silicone solvent or an organic solvent;
with the total weight % of the coating composition being 100 weight %.

12. The method in accordance with claim 1, wherein the reactive interlayer is allowed to dry and/or cure on the substrate surface onto which it was first applied and then subsequently the silicone based material surface is brought into contact with the substrate surface and pressure applied to sandwich the reactive interlayer.

13. The method in accordance with claim 1, wherein the silicone based material is a tile adhesive which is chemically bonded to a tile and has a release paper preventing unwanted adhesion until in its correct position.

14. The method in accordance with claim 1, for producing a laminate in which the reactive interlayer is strongly adhered to the silicone based material and a surface of a plastic film substrate.

15. The method in accordance with claim 1, wherein the substrate is a construction panel, glass sheets for flat panel displays, glass panels for facades or cars, or metal, plastic, wood, concrete or stone plates for construction, automotive, or electronics.

16. The method in accordance with claim 1, wherein the cured silicone material is a pre-cured spacer of a transparent device.

* * * * *